United States Patent
Krishnakumar et al.

(10) Patent No.: US 8,953,800 B2
(45) Date of Patent: Feb. 10, 2015

(54) METHOD FOR TRANSPORTING LOW-BIT RATE INFORMATION

(75) Inventors: Anjur Sundaresan Krishnakumar, Princeton, NJ (US); Lawrence O'Gorman, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1153 days.

(21) Appl. No.: 12/708,125

(22) Filed: Feb. 18, 2010

(65) Prior Publication Data
US 2011/0144985 A1 Jun. 16, 2011

Related U.S. Application Data

(60) Provisional application No. 61/286,042, filed on Dec. 14, 2009.

(51) Int. Cl.
*H04K 1/02* (2006.01)
*G10L 19/018* (2013.01)
*H04L 9/32* (2006.01)

(52) U.S. Cl.
CPC ............ *G10L 19/018* (2013.01); *H04L 9/3226* (2013.01); *H04K 1/02* (2013.01)
USPC ............ 380/252; 704/200; 704/201; 704/270

(58) Field of Classification Search
CPC .................... H04N 21/8358; H04N 2201/3233
USPC .................. 704/200, 201, 230, 500; 382/100; 380/252–254
See application file for complete search history.

(56) References Cited

U.S. PATENT DOCUMENTS

| 5,161,210 | A | * | 11/1992 | Druyvesteyn et al. | 704/200 |
| 5,812,075 | A | | 9/1998 | Betts et al. | |
| 5,995,923 | A | * | 11/1999 | Mermelstein et al. | 704/219 |
| 6,675,146 | B2 | * | 1/2004 | Rhoads | 704/270 |
| 7,970,166 | B2 | * | 6/2011 | Carr et al. | 382/100 |

(Continued)

OTHER PUBLICATIONS

Micah K. Johnson ; Siwei Lyu and Hany Farid "Steganalysis of recorded speech", Proc. SPIE 5681, Security, Steganography, and Watermarking of Multimedia Contents VII, 664 (Mar. 31, 2005); doi:10.1117/12.586941; http://dx.doi.org/10.1117/12.586941.*

(Continued)

*Primary Examiner* — Shaun Roberts
(74) *Attorney, Agent, or Firm* — Maldjian Law Group LLC; John Maldjian; Alexander D. Walter

(57) ABSTRACT

A method is presented that uses steganographic codeword(s) carried in a speech payload in such a way that (i) the steganographic codeword(s) survive compression and/or transcoding as the payload travels from a transmitter to a receiver across at least one diverse network, and (ii) the embedded steganographic codeword(s) do not degrade the perceived voice quality of the received signal below an acceptable level. The steganographic codewords are combined with a speech payload by summing the amplitude of a steganographic codeword to the amplitude of the speech payload at a relatively low steganographic-to-speech bit rate. Advantageously, the illustrative embodiment of the present invention enables (i) steganographic codewords to be decoded by a compliant receiver and applied accordingly, and (ii) legacy or non-compliant receivers to play the received speech payload with resultant voice quality that is acceptable to listeners even though the steganographic codeword(s) remain in the received speech payload.

19 Claims, 13 Drawing Sheets

(56) References Cited

U.S. PATENT DOCUMENTS

| | | | |
|---|---|---|---|
| 7,987,094 B2* | 7/2011 | Rhoads | 704/270 |
| 8,055,903 B2* | 11/2011 | Adhikari et al. | 713/181 |
| 8,204,222 B2* | 6/2012 | Rhoads | 380/242 |
| 2004/0068404 A1* | 4/2004 | Tanaka et al. | 704/229 |
| 2006/0062386 A1* | 3/2006 | Rhoads | 380/236 |
| 2008/0199009 A1 | 8/2008 | Adhikari et al. | |

OTHER PUBLICATIONS

Lubacz et al., "Vice Over IP : A Growing Cadre of Criminals Is Hiding Secret Messages in Voice Data", "IEEE Spectrum North American", Feb. 2010, vol. 47, No. 2, Publisher: IEEE, Published in: US.

* cited by examiner

METHOD FOR TRANSPORTING LOW-BIT RATE INFORMATION

CROSS REFERENCE TO RELATED APPLICATIONS

This application claims the benefit of U.S. provisional application No. 61/286,042, entitled "Method for Transporting Low-Bit Rate Information" and filed Dec. 14, 2009. The concepts, but not necessarily the nomenclature, of this provisional application are hereby incorporated by reference.

FIELD OF THE INVENTION

The present invention relates to telecommunications in general, and, more particularly, to transmitting speech and signaling.

BACKGROUND OF THE INVENTION

In telecommunications networks, it is sometimes necessary to transmit supplemental information to a receiver—supplemental messages that are above and beyond the speech payload generated by the transmitter. Such supplemental messages are used for network signaling and for a variety of applications, e.g., authentication, display information, ring tones, enhanced features, etc. Traditionally, a number of techniques have been used to send a supplemental message from transmitter to receiver in such a way as to carry the speech payload without unacceptably degrading the voice quality perceived by the listener.

One technique for carrying supplemental messages within traditional (G.711) networks has been to over-write some of the bits of the speech payload. This over-writing technique is known in the art as "bit-robbing," because it re-purposes part of the transmitted speech payload to send the desired supplemental message. This technique has pronounced limitations in some networks.

Bit-robbing has proven ineffective when the speech payload travels outside the boundaries of a traditional G.711 network and encounters other types of networks. In such a scenario, a subsequent network is "unaware" that a supplemental message is embedded in the speech payload and the subsequent network operates on the speech payload as though the speech payload were entirely composed of speech.

Each network compresses or otherwise encodes the speech payload depending on the transmission technology employed by that network. For example, a G.729 network transmits only certain key characteristics (also known as model parameters) of a speech payload instead of the payload itself in order to conserve network utilization, i.e., bandwidth. A G.729 network compresses an ordinary speech payload from 64 Kbps to 8 Kbps—an eight-fold compression that is quite economical, but that can produce poor results when the speech payload comprises supplemental messages.

The disadvantage of the G.729 compression technique on the transmission of speech payloads that comprise supplemental messages becomes evident when reconstructing speech at the receiving end, because distortion is caused by the changes to the key characteristics of the speech payload that occurred in the encoding phase. When some key characteristics undergo changes beyond certain ranges during encoding, the quality of the reconstructed speech—based on the received key characteristics—suffers. In other words, reconstructing and playing a speech payload that comprises a supplemental message is risky and typically results in poor voice quality as perceived by a listener.

Not only is there risk in unacceptably degrading the voice quality of the play-back speech, but too, the supplemental message is lost in this scenario. Therefore, authentication, display information, etc. are not applied at the receiver.

When the scenario is repeated such that a speech payload comprising supplemental messages must travel across yet another type of network, the degradation is exacerbated. Therefore, there is a perceived need for a way to transmit a speech payload comprising supplemental messages from a transmitter to a receiver across a variety of network types such that (i) the supplemental messages survive the cross-network boundaries and (ii) the voice quality perceived at the receiving end is acceptably good.

FIG. 1 depicts a schematic diagram of the salient portions of telecommunications system 100 in the prior art. Telecommunication system 100 comprises: microphone 101, legacy transmitter 102, telecommunications network 103-1, legacy receiver 104-1, speaker 105-1, gateway/transcoder 106, telecommunications network 103-2, legacy receiver 104-2, and speaker 105-2.

Microphone 101 is an apparatus that captures an audio signal (e.g., a person's speech, a group of people's collective speech, a music source, an audio broadcast, an audio stream, etc.) and provides it to legacy transmitter 102. For the purposes of this specification, the term "audio signal" is used interchangeably with the following terms: speech input, speech output, speech, analog signal, analog speech signal, voice, acoustic signal, sound.

Legacy transmitter 102 is an apparatus that transmits the audio signal to telecommunications network 103-1 and is described in more detail in FIG. 2.

Telecommunications network 103-1 and telecommunications network 103-2 are telecommunications networks that are capable of carrying speech from a transmitter to a receiver. Telecommunications network 103-1 carries speech originating at microphone 101 to legacy receiver 104-1 for speaker 105-1.

Telecommunications network 103-1 and telecommunications network 103-2 are technologically different from each other, meaning that they require some form of encoding, transcoding, or other manner of protocol conversion in order to carry speech originating at microphone 101 to a final destination at speaker 105-2. The protocol conversion is performed by gateway/transcoder 106. For example, telecommunications network 103-1 is a network that uses G.711 mu-law to encode speech and telecommunications network 103-2 is a network that uses G.729 to encode speech, wherein G.711 and G.729 are ITU-T standard voice encoding protocols.

Legacy receiver 104-1 is an apparatus that receives transmissions from telecommunications network 103-1 and produces output for speaker 105-1. Legacy receiver 104-1 is described in more detail in FIG. 3.

Speakers 105-1 and 105-2 are apparatuses that output audio signals (e.g., speech, music, an audio stream, etc.).

Gateway/transcoder 106 is an apparatus that is equipped for interfacing a network with another network that uses different protocols. Gateway/transcoder 106 performs the encoding, decoding, transcoding, or any protocol conversions necessary to allow transmissions from telecommunications network 103-1 to reach destinations on telecommunications network 103-2 or to traverse telecommunications network 103-2 for other destinations beyond.

Legacy receiver 104-2 is an apparatus that receives transmissions from telecommunications network 103-2 and produces output for speaker 105-2. Legacy receiver 104-2 is described in more detail in FIG. 3. Although legacy receiver 104-2 is generally analogous to legacy receiver 104-1 described above, it should be noted that in the illustrative embodiment wherein telecommunications network 103-1 and telecommunications network 103-2 are technologically diverse as to voice encoding protocols, legacy receiver 104-1 and legacy receiver 104-2 are correspondingly technologically diverse, each legacy receiver being capable of decoding the respective encoded signal received from the respective network that uses the network's respective voice encoding protocol.

Speaker 105-2 is identical to speaker 105-1. Speaker 105-2 receives a payload from legacy receiver 104-2. In the present specification, all references to speaker 105-2 equally apply to speaker 105-1.

FIG. 2 depicts a schematic diagram of the salient portions of legacy transmitter 102 in the prior art. Legacy transmitter 102 comprises: analog-to-digital converter 201 and channel encoder 202.

Analog-to-digital converter 201 is an apparatus that converts an analog audio signal received from microphone 101 to a digital signal. Analog-to-digital converter 201 converts an analog signal from microphone 101 to a 64-kilobit per second (8 kilo-sample-per second, 8-bit per sample) pulse-code modulation ("PCM") signal, which is a digital representation of an analog signal whose magnitude is sampled at uniform intervals and which is quantized into a digital format, resulting in a digital speech signal.

Channel encoder 202 encodes the digital speech signal from analog-to-digital converter 201 into a format suitable for transmission across telecommunications network 103-1, i.e., an encoded speech signal. Thus, channel encoder 202 is a G.711 mu-law codec for a North American telecommunications network. It will be clear to those having ordinary skill in the art how to make and use other embodiments of channel encoder 202 that encodes to another voice encoding protocol, such as A-law G.711, G.722, G.729, etc., as appropriate for telecommunications network 103-1.

It will be clear to those having ordinary skill in the art that some channel encoders compress the received signal to a lower bit rate than the received signal in conformance with the respective voice encoding protocol. It will be clear to those having ordinary skill in the art that in this context a "channel encoder" is also known in the art as a coder-decoder, or a compressor-decompressor, or a "codec," or an audio compressor, or an encoder-decoder, or an "endec" device, etc.

FIG. 3 depicts a schematic diagram of the salient portions of a legacy receiver in the prior art. It will be clear to those having ordinary skill in the art that "Speaker 105-$j$" means any one of the speakers depicted in FIG. 1, i.e., speaker 105-1 or speaker 105-2. It will be clear to those having ordinary skill in the art that "Telecommunications Network 103-$i$" means any one of the networks depicted in FIG. 1, i.e., telecommunications network 103-1 or 103-2.

Legacy receiver 104-$j$ comprises: channel decoder 301-$j$ and digital-to-analog converter 302-$j$, wherein $j \in \{1, 2\}$.

Channel decoder 301-$j$ decodes the encoded speech signal received from telecommunications network 103-$i$ into an estimate of the digital speech signal. Thus, channel decoder 301-1 is a G.711 mu-law codec for a North American voice network when connected to telecommunications network 103-1. Channel decoder 301-2 is a G.729 codec when connected to telecommunications network 103-2. It will be clear to those having ordinary skill in the art how to make and use channel decoder 301-$j$ that decodes from at least one voice encoding protocol, such as A-law G.711, G.722, G.729, etc., as appropriate for the network connected to channel decoder 301-$j$.

It will be clear to those having ordinary skill in the art that some channel decoders decompress the received encoded speech signal from a lower received bit rate to a higher bit rate, in conformance with the received voice encoding protocol, typically into a PCM signal. It will be clear to those having ordinary skill in the art that in this context a "channel decoder" is also known in the art as a coder-decoder, or a compressor-decompressor, or a "codec," or an audio decompressor, or an encoder-decoder, or an "endec" device, etc.

Digital-to-analog converter 302-$j$ is a digital-to-analog converter that converts an estimate of the digital speech signal received from channel decoder 301-$j$ (typically a PCM signal) into an analog audio signal destined for speaker 105-$j$.

FIG. 4 depicts a flowchart of the salient tasks associated with telecommunications system 100 in the prior art.

At task 401, a speech input is collected. It will be clear to those having ordinary skill in the art how to collect speech input.

At task 402, the speech input is converted from analog to a digital speech signal, typically PCM.

At task 403 the digital speech signal is channel encoded for transmission to the network.

At task 404 the encoded speech signal is transported across the network.

At task 405, the encoded speech signal reaches a decision point, i.e., whether it has reached a gateway/transcoder or a final destination. In the case where a gateway/transcoder has been reached, task 406 follows. In the case where a final destination has been reached, task 407 follows.

At task 406, the encoded speech signal undergoes transcoding to another voice encoding protocol. It will be clear to those having ordinary skill in the art that "transcoding" in this context is well known in the art as any one of several methods of converting a first encoded speech signal based on one type of voice encoding to another encoded speech signal based on another type of voice encoding. Task 406 is followed by transport across another network at task 404 and the process continues indefinitely until the transmitted encoded speech signal reaches a final destination at task 405.

At task 407, the encoded speech signal that reached a final destination at task 405 is decoded. The resultant signal is an estimate of the digital speech signal created at task 403.

At task 408, the estimate of the digital speech signal is converted to analog speech.

At task 409 the analog speech is output.

SUMMARY OF THE INVENTION

The present invention provides a mechanism for conveying steganographic information through a transcoder without some of the costs and disadvantages for doing so in the prior art. A system in accordance with the illustrative embodiment uses steganographic codeword(s) carried in a speech payload in such a way that (i) the steganographic codeword(s) survive compression and transcoding as the payload travels from a transmitter to a receiver across different types of network technologies, and (ii) the embedded steganographic codeword(s) do not degrade the perceived voice quality of the received signal below an acceptable level. The steganographic codeword(s) are used in the illustrative embodiment to transmit supplemental messages to both compliant receivers that are able to decode the supplemental messages, and to legacy receivers that lack such a capability.

Steganography is the hiding of information in another signal. The illustrative embodiment combines steganographic codewords with a speech payload by summing the amplitude of a steganographic codeword to the amplitude of a speech payload. The resulting payload, comprising both speech and steganographic codewords, produces audio signals of a sufficiently acceptable voice quality when played without decoding at the receiving end—which is advantageous for interoperability with non-compliant or legacy receivers. Compliant receivers decode the steganographic codewords, which have survived either compression or transcoding or both across network boundaries, and accordingly apply the decoded message for a variety of applications. For example, in the illustrative embodiment, the message is applied for authenticating the transmitter to defend against denial of service attacks, for call control, for proprietary call signaling between transmitter and receiver, etc.

Thus, advantageously, the illustrative embodiment enables (i) steganographic codewords to be decoded by a compliant receiver and applied accordingly, and (ii) legacy or non-compliant receivers to play the received speech payload with resultant voice quality that is acceptable to listeners even though the steganographic codeword(s) remain in the speech payload.

The illustrative embodiment comprises: summing by a transmitter the amplitude of a plurality of codewords to the amplitude of a speech signal to generate a steganographic speech signal;

encoding the steganographic speech signal in accordance with a voice encoding protocol to generate an encoded speech signal;

decoding the encoded speech signal in accordance with the voice encoding protocol to generate an estimate of the steganographic speech signal; and detecting by a receiver an estimate of the plurality of codewords from the estimate of the steganographic speech signal.

DETAILED DESCRIPTION

Figure 1:
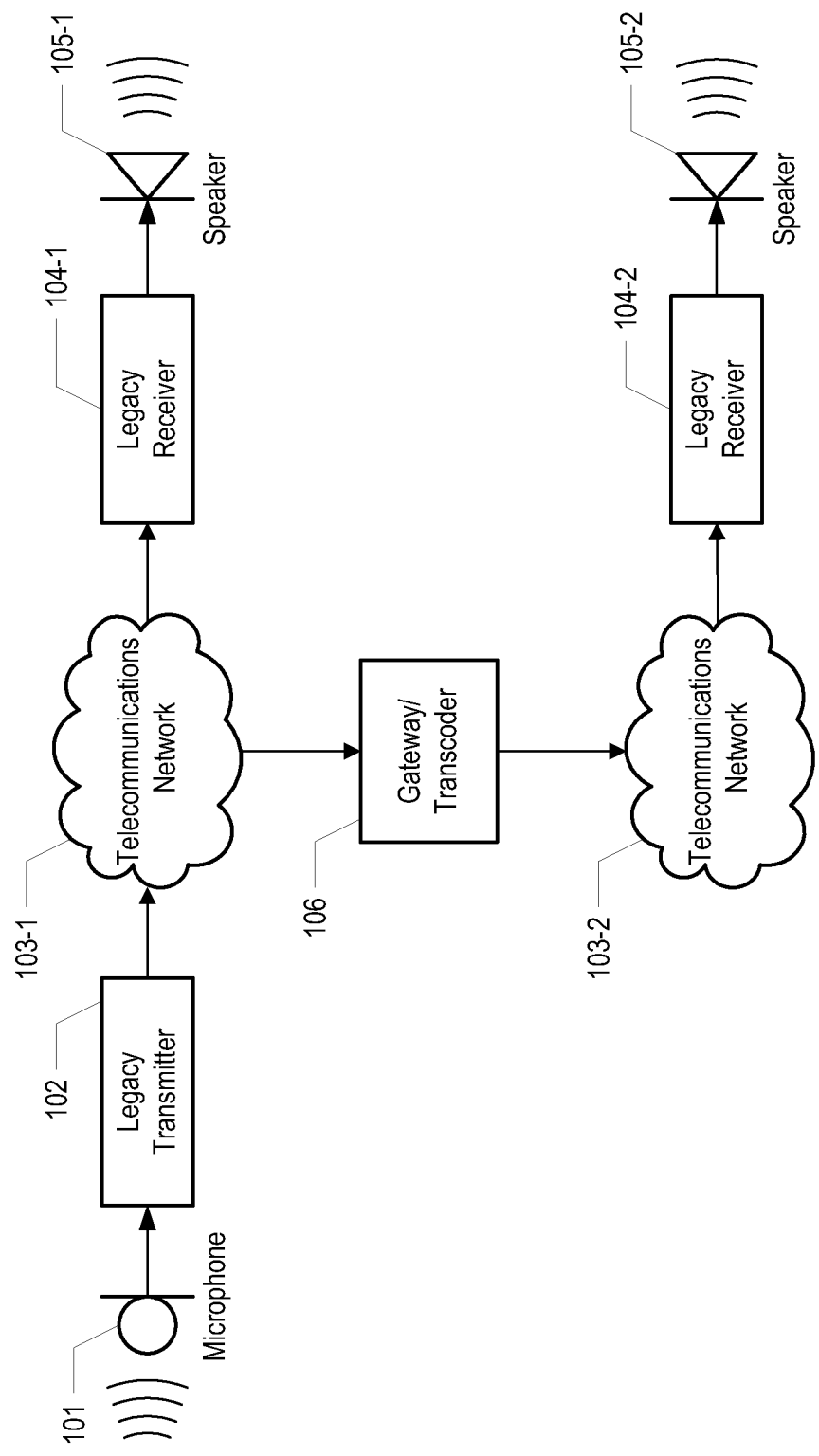
FIG. 1 depicts a schematic diagram of the salient portions of telecommunications system 100 in the prior art.
Figure 2:
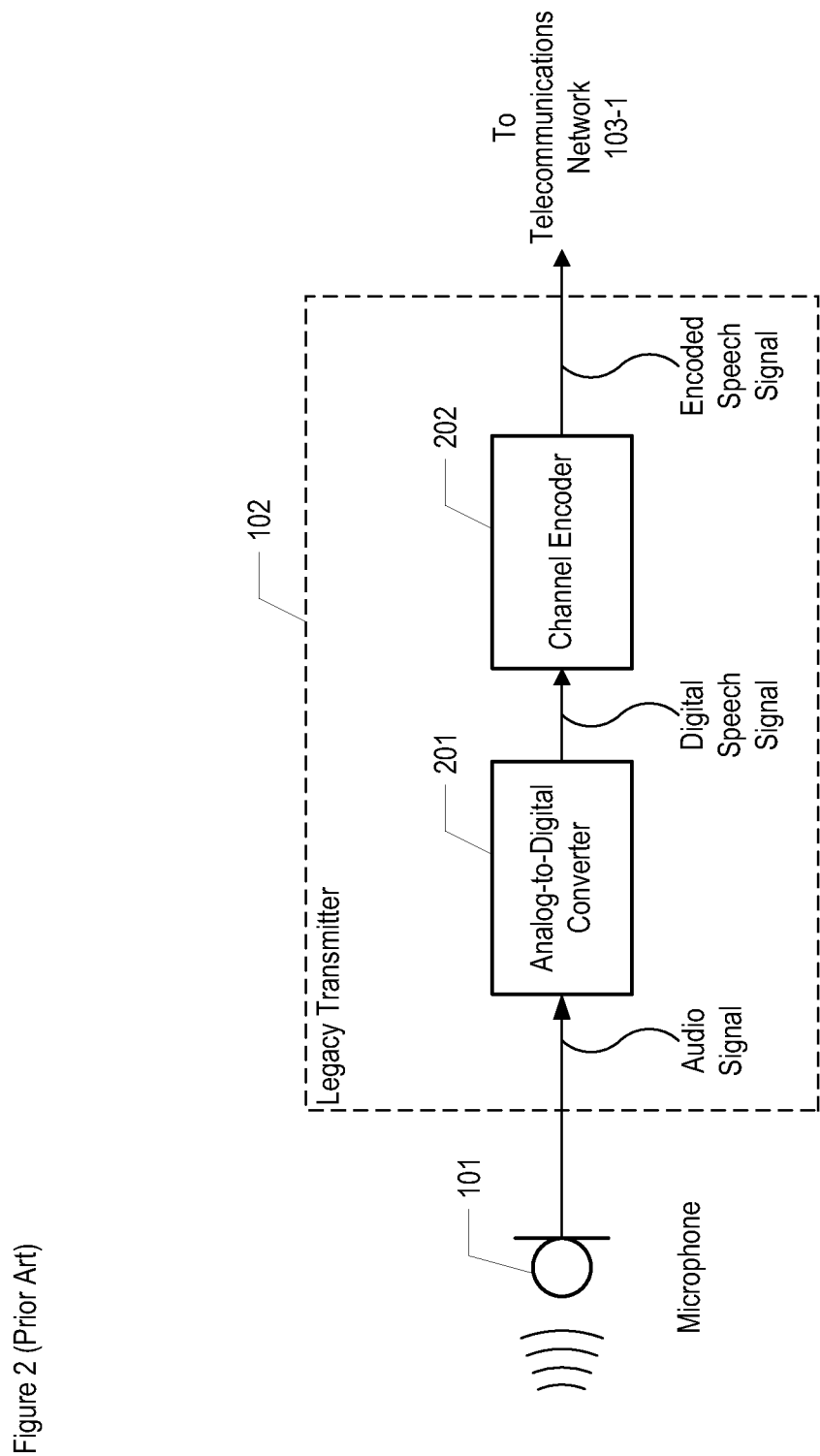
FIG. 2 depicts a schematic diagram of the salient portions of legacy transmitter 102 in the prior art.
Figure 3:
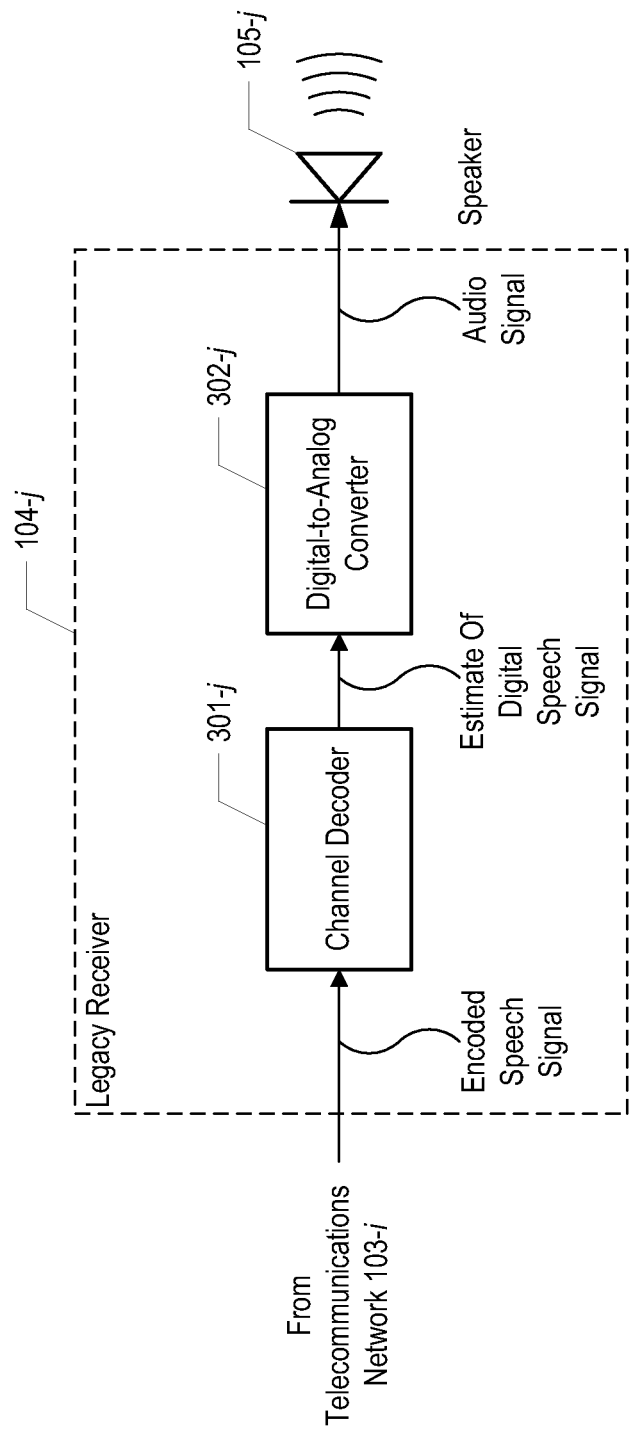
FIG. 3 depicts a schematic diagram of the salient portions of a legacy receiver in the prior art.
Figure 4:
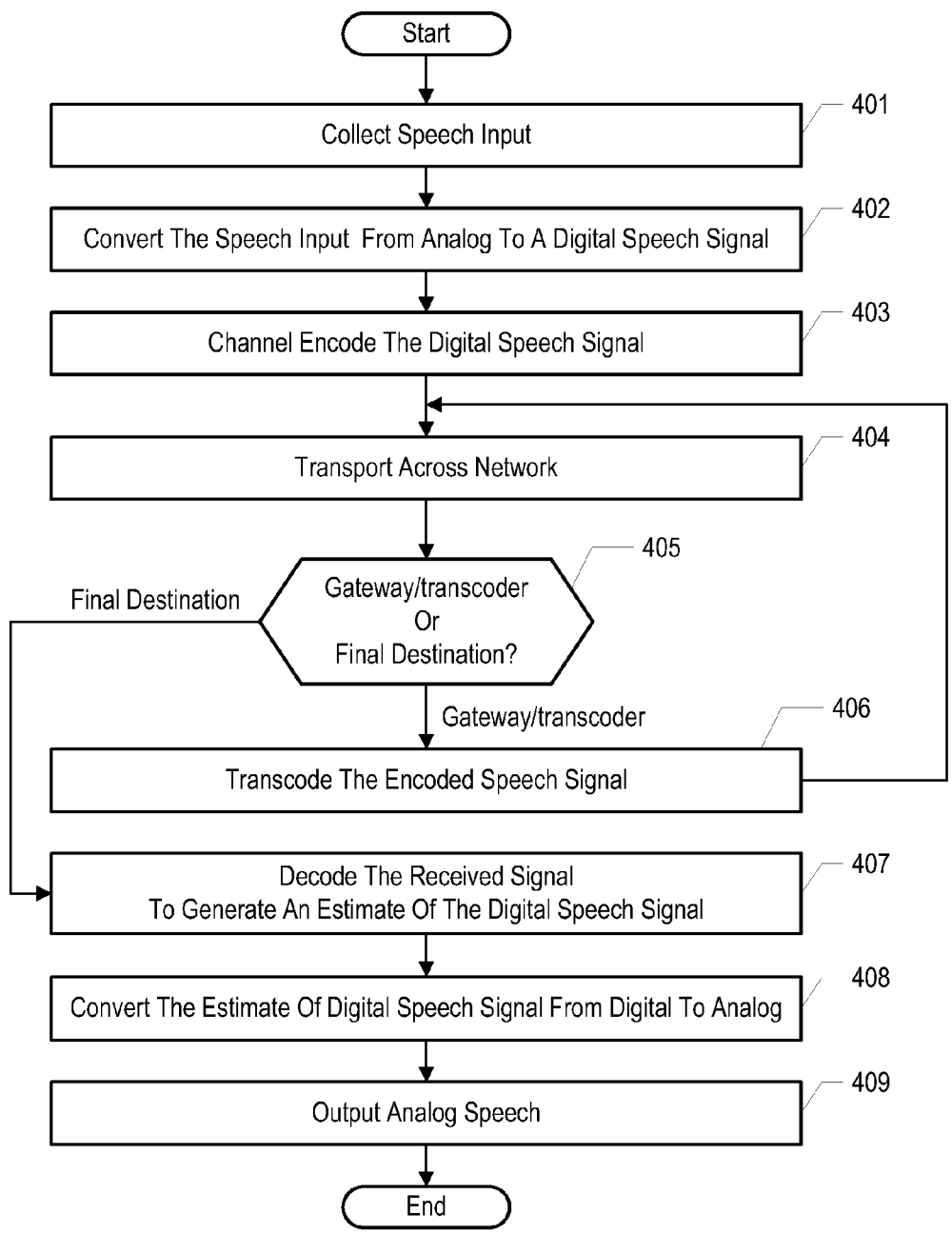
FIG. 4 depicts a flowchart of the salient tasks associated with telecommunications system 100 in the prior art.
Figure 5:
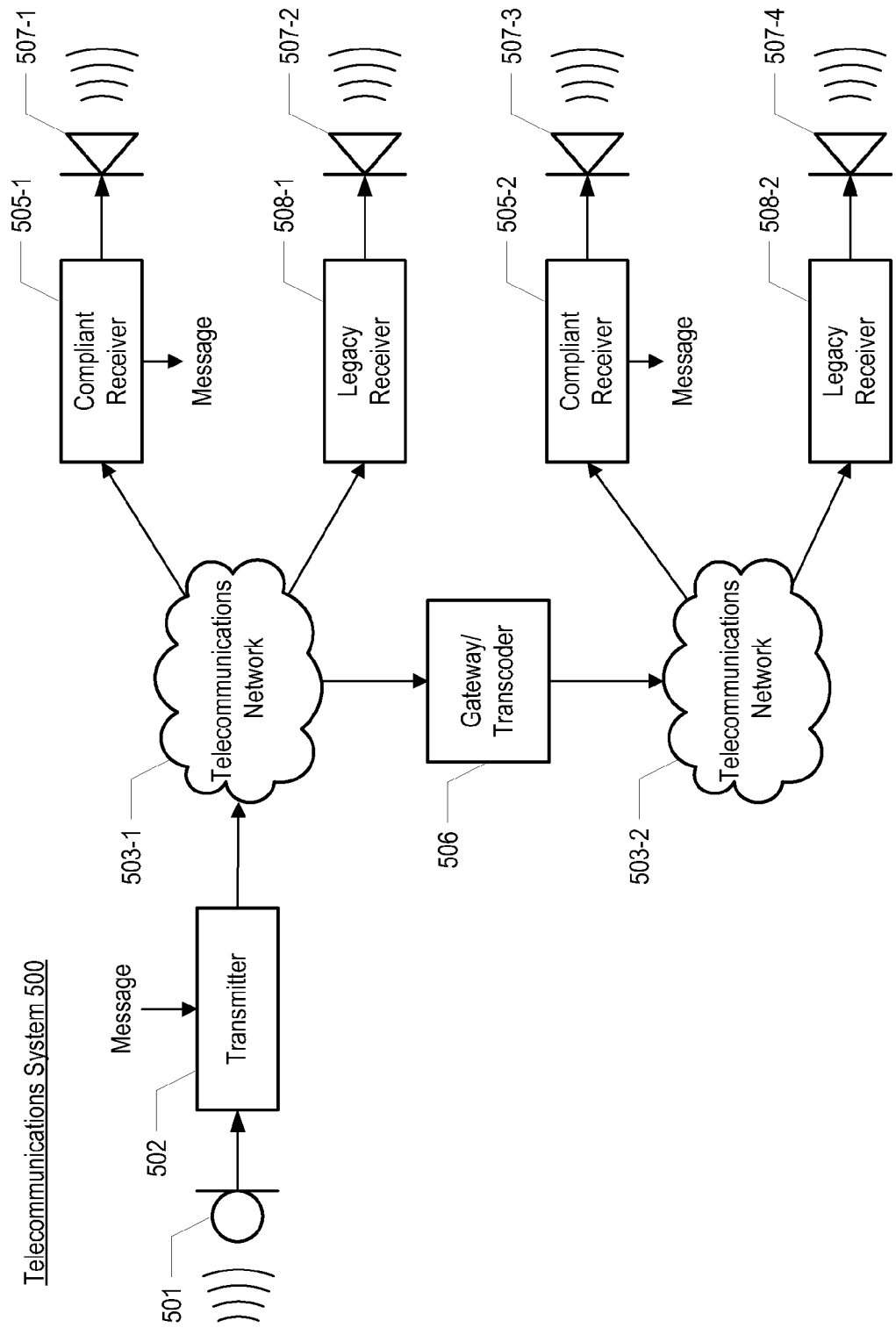
FIG. 5 depicts a schematic diagram of the salient portions of telecommunications system 500 in accordance with the illustrative embodiment.

FIG. 5 depicts a schematic diagram of the salient portions of telecommunications system 500 in accordance with the illustrative embodiment. Telecommunications system 500 comprises: microphone 501, transmitter 502, telecommunications networks 503-1 and 503-2, compliant receivers 505-1 and 505-2, gateway/transcoder 506, speakers 507-1 through 507-4, and legacy receivers 508-1 and 508-2, interconnected as shown.

Although the illustrative embodiment comprises one transmitter (i.e., transmitter 502), it will be clear to those having ordinary skill in the art, after reading this disclosure, how to make and use alternative embodiments of the present invention that comprise any number of transmitters.

Although the illustrative embodiment comprises one transmitter (i.e., transmitter 502) that is compliant with the present invention, it will be clear to those having ordinary skill in the art, after reading this disclosure, how to make and use alternative embodiments of the present invention that also comprises one or more legacy transmitters.

Although the illustrative embodiment comprises one message that is input to transmitter 502, it will be clear to those having ordinary skill in the art, after reading this disclosure, how to make and use alternative embodiments of the present invention that comprise any number of messages that are input to transmitter 502, e.g., two messages, three messages, etc.

Although the illustrative embodiment comprises two networks (i.e., telecommunications networks 503-1 and 503-2), it will be clear to those having ordinary skill in the art, after reading this disclosure, how to make and use alternative embodiments of the present invention that comprise any number of telecommunications networks, e.g., one network, three networks, etc.

Although the illustrative embodiment comprises one gateway/transcoder (i.e., gateway/transcoder 506), it will be clear to those having ordinary skill in the art, after reading this disclosure, how to make and use alternative embodiments of the present invention that comprise any number of gateways/transcoders, e.g., two gateways/transcoders, three gateways/transcoders, etc.

Although the illustrative embodiment comprises two compliant receivers (i.e., compliant receiver 505-1 and compliant receiver 505-2), it will be clear to those having ordinary skill in the art, after reading this disclosure, how to make and use alternative embodiments of the present invention that comprise any number of compliant receivers, e.g., one compliant receiver, three compliant receivers, etc.

Although the illustrative embodiment comprises two legacy receivers (i.e., legacy receiver 508-1 and legacy receiver 508-2), it will be clear to those having ordinary skill in the art, after reading this disclosure, how to make and use alternative embodiments of the present invention that comprise any number of legacy receivers, e.g., no legacy receiver, one legacy receiver, three legacy receivers, etc. Although the illustrative embodiment illustrates legacy receivers that are distinct components from compliant receivers, it will be clear to those having ordinary skill in the art, after reading the present disclosure, how to make and use alternative embodiments of the present invention that comprise at least one unified component that comprises at least one legacy receiver and at least one compliant receiver.

Although the illustrative embodiment comprises only one message that is output from a compliant receiver, i.e., the message that is output from compliant receiver 505-1 and the message that is output from compliant receiver 505-2, it will be clear to those having ordinary skill in the art, after reading this disclosure, how to make and use alternative embodiments of the present invention that comprise any number of messages that are output from a compliant receiver, e.g., two messages, three messages, etc.

Although the illustrative embodiment comprises four speakers (i.e., speakers 507-1, 507-2, 507-3, and 507-4), it will be clear to those having ordinary skill in the art, after reading this disclosure, how to make and use alternative embodiments of the present invention that comprise any number of speakers, e.g., one speaker, two speakers, etc.

Although the illustrative embodiment comprises certain ratios of components relative to other components, e.g., a ratio of one microphone per transmitter, it will be clear to those having ordinary skill in the art, after reading this disclosure, how to make and use alternative embodiments of the present invention that comprise any ratio of one type of component relative to any other type of component, e.g., two microphones per transmitter, three speakers per compliant receiver, etc. Furthermore, although the illustrative embodiment depicts distinct components, it will be clear to those having ordinary skill in the art, after reading the present disclosure, how to make and use alternative embodiments of the present invention that comprise at least one unified component that comprises at least one of the named components of telecommunications system 500.

Microphone 501 is identical to microphone 101 in the prior art.

Transmitter 502 is an apparatus that receives a speech signal and a message, that steganographically embeds the message into the speech signal, and that transmits the resulting signal to telecommunications network 503-1. Transmitter 502 is described in detail below and in the accompanying figures. In the illustrative embodiment, the message that is input to transmitter 502 is a 128-bit string, but it will be clear to those having ordinary skill in the art, after reading this disclosure, how to make and use alternative embodiments in which the message is of any arbitrary length at the discretion of the implementer. Transmitter 502 uses the message to authenticate itself to compliant receivers 505-1 and 505-2, but it will be clear to those having ordinary skill in the art, after reading this disclosure, how to make and use alternative embodiments of the present invention in which the information in the message is used for another purpose.

Telecommunications network 503-1 carries speech signals in the G.711 format and is identical to telecommunications network 103-1 in the prior art.

Telecommunications network 503-2 carries speech signals in the G.729 format and is identical to telecommunications network 103-2 in the prior art.

Compliant receiver 505-1 is an apparatus that receives an encoded speech signal from telecommunications network 503-1. Compliant receiver 505-1 recovers and outputs the message. The message that is output from compliant receiver 505-1, i.e., the first message, is information that compliant receiver 505-1 decoded from the encoded speech signal it received from telecommunications network 503-1. It will be clear to those having ordinary skill in the art, after reading the present disclosure, how the message that is output from compliant receiver 505-1 is decoded and used. Compliant receiver 505-1 also decodes and outputs the acoustic signal. Compliant receiver 505-1 is described in detail below and in the accompanying figures.

Compliant receiver 505-2 is identical to compliant receiver 505-1 except that it decodes the acoustic signal in accordance with the G.729 protocol, rather than the G.711 protocol.

Gateway/transcoder 506 is a G.711-to-G.729 gateway and is identical to gateway/transcoder 106 in the prior art. It will be clear to those having ordinary skill in the art, after reading this disclosure, how to make and use alternative embodiments of the present invention in which telecommunications networks 503-1 and 503-2 use any different types of voice encoding, e.g., G.711 and G.722, G.722 and G.729, etc. Furthermore, it will be clear to those having ordinary skill in the art, after reading this disclosure, how to make and use alternative embodiments of the present invention in which gateway/transcoder 506 performs the necessary protocol conversions, encoding, transcoding or compression to allow speech to travel from microphone 501 to speaker 507-3 or to speaker 507-4 or both or to any other speaker connected to telecommunications network 503-2.

Speaker 507-$k$ is identical to speaker 105-1 in the prior art, wherein $k \in \{1, 2, 3, 4\}$.

Legacy receiver 508-1 is an apparatus that receives an encoded speech signal from telecommunications network 503-1 and decodes and outputs the acoustic signal to speaker 507-2. Legacy receiver 508-1 is identical to receiver 104-1 in the prior art. Because legacy receiver 508-1 lacks the ability to extract the steganographic signal from the encoded speech signal, legacy receiver 508-1 outputs the decoded speech signal—which still comprises the steganographic signal— through speaker 507-2. The steganographic nature of the encoding effectively hides the steganographic signal, and, therefore, creates a minimum of distortion in the output signal.

Legacy receiver 508-2 is identical to legacy receiver 508-1 except that it decodes the encoded speech signal in accordance with the G.729 protocol, rather than the G.711 protocol.

Figure 6:
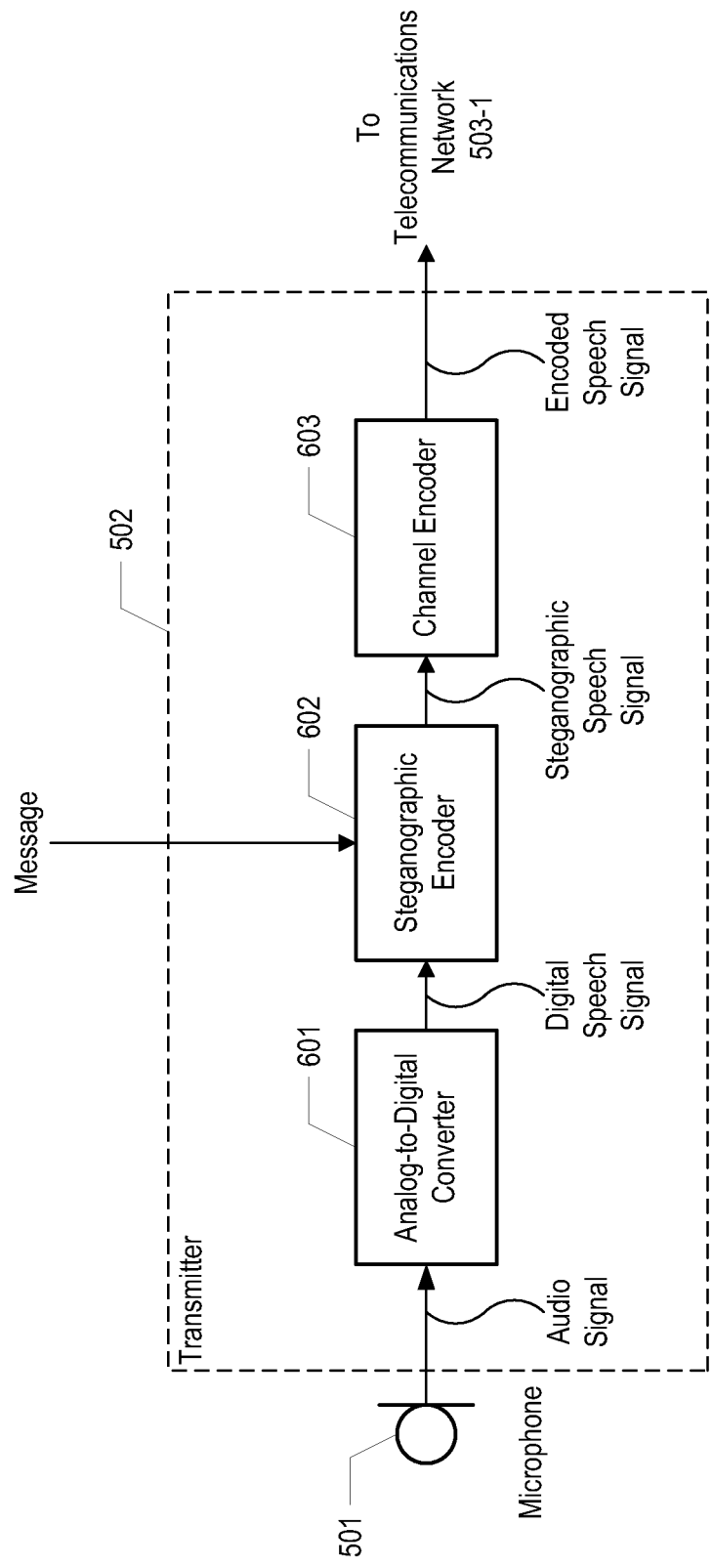
FIG. 6 depicts a schematic diagram of the salient portions of transmitter 502 in accordance with the illustrative embodiment.

FIG. 6 depicts a schematic diagram of the salient portions of transmitter 502 in accordance with the illustrative embodiment. Transmitter 502 comprises: analog-to-digital converter 601, steganographic encoder 602, and channel encoder 603. Transmitter 502 receives inputs from microphone 501 and from the message that is input to transmitter 502.

Analog-to-digital converter 601 is an analog-to-digital converter that is identical to analog-to-digital converter 201 in the prior art.

Steganographic encoder 602 is an apparatus that receives the digital speech signal from analog-to-digital converter 601 and combines it with the message that is input to transmitter 502 to produce a steganographic speech signal for channel encoder 603. The method for encoding the steganographic speech signal is described in below and in the accompanying figures. It will be clear to those having ordinary skill in the art, after reading the present disclosure, how to make and use steganographic encoder 602.

Channel encoder 603 is identical to channel encoder 202 in the prior art and is G.711 mu-law compatible. Channel encoder 603 receives the steganographic speech signal from steganographic encoder 602 and outputs an encoded speech signal to the network.

Figure 7:
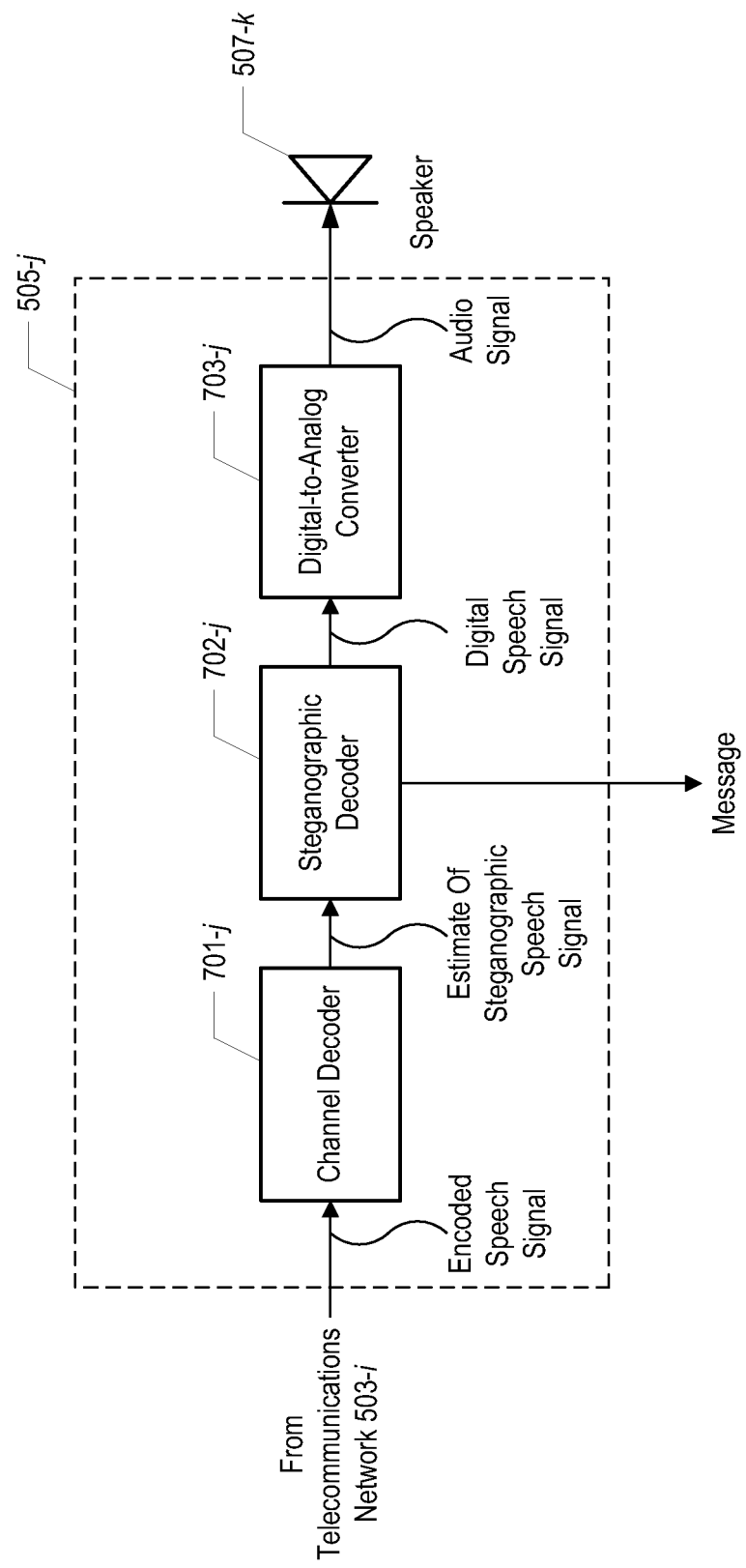
FIG. 7 depicts a schematic diagram of the salient portions of a compliant receiver in accordance with the illustrative embodiment.

FIG. 7 depicts a schematic diagram of the salient portions of compliant receiver 505-$j$ in accordance with the illustrative embodiment. Compliant receiver 505-$j$ comprises: channel decoder 701-$j$, steganographic decoder 702-$j$, and digital-to-analog converter 703-$j$, wherein $j \in \{1, 2\}$.

Channel decoder 701-*j* is identical to channel decoder 301-*j* in the prior art. Channel decoder 701-*j* outputs an estimate of the steganographic speech signal to steganographic decoder 702-*j*. Thus, channel decoder 701-1 is a G.711 mu-law codec for a North American voice network when connected to telecommunications network 503-1. Channel decoder 701-2 is a G.729 codec when connected to telecommunications network 503-2.

Steganographic decoder 702-*j* is an apparatus that receives the estimate of the steganographic speech signal from channel decoder 701-*j* and detects both (i) the message that is transmitted by transmitter 502 and (ii) a digital speech signal. The digital speech signal is sent to digital-to-analog converter 703-*j*. The method performed by steganographic decoder 702-*j* is described in more detail below and in the accompanying figures.

Digital-to-analog converter 703-*j* is identical to digital-to-analog converter 302-*j* in the prior art.

Figure 8:
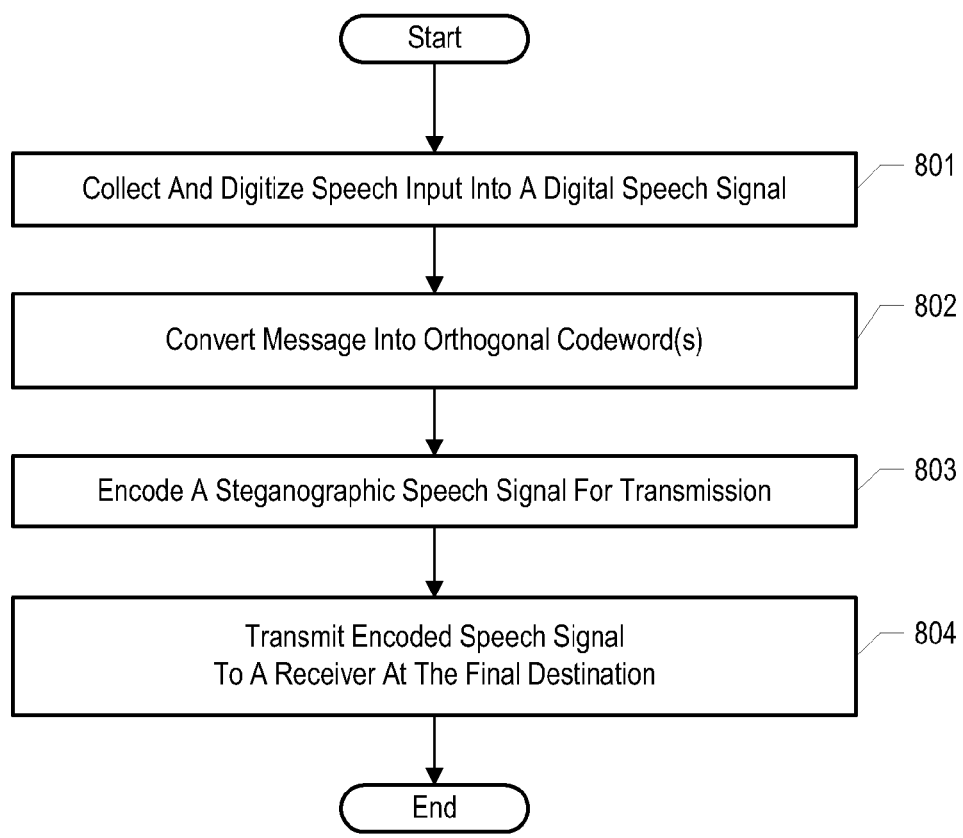
FIG. 8 depicts a flowchart of the salient tasks associated with transmitter 502 in accordance with the illustrative embodiment of the present invention.

FIG. 8 depicts a flowchart of the salient tasks performed by transmitter 502 in accordance with the illustrative embodiment of the present invention.

It will be clear to those having ordinary skill in the art, after reading the present disclosure, how to make and use alternative embodiments of the present invention in which the tasks depicted in FIG. 8 are performed in a different order or are performed concurrently. Furthermore, it will be clear to those having ordinary skill in the art, after reading the present disclosure, how to make and use alternative embodiments of the present invention in which the tasks depicted in FIG. 8 are aggregated differently.

At task 801, a time-varying speech signal t(s) is collected from microphone 501 in well-known fashion and converted into an 8 kilo-samples-per-second, 8-bit-per-sample pulse code modulated (PCM) digital speech signal.

At task 802, the 128-bit message (i.e., the supplemental message that is to be steganographically transmitted) is input to transmitter 502 and is converted in well-known fashion into a set of N orthogonal codewords, such as Walsh codes, wherein $N=2^m$ and m is a positive integer. The use of N orthogonal codewords in this fashion means that each codeword in the set of N codewords conveys m bits of information from the supplemental message. Thus, the reception of one codeword is equivalent to the reception of m bits of supplemental information. Therefore, in the illustrative embodiment, the 128-bit message requires 128/m codewords. In the illustrative embodiment m=2 and N=4.

Although the illustrative embodiment uses Walsh codes, it will be clear to those having ordinary skill in the art, after reading this disclosure, how to make and use alternative embodiments of the present invention that use any orthogonal codewords (e.g., Gold codes, etc.) from any set of orthogonal codewords. The codeword sets may be selected in any number of ways by one skilled in the art. Although the illustrative embodiment uses a set of 4 codewords, it will be clear to those having ordinary skill in the art, after reading this disclosure, how to make and use alternative embodiments of the present invention that use a different set of N codewords.

A codeword is constructed such that it has a number of elements equal to the number of samples in the speech packet, and each element is represented by the same number of bits used in the speech packet to encode the voice samples. In the illustrative embodiment, a +1/−1 codeword for a PCM sample has 40 +1s alternating with 40 −1s each represented by an 8-bit code, thus matching the voice packet of 80 samples at 8 bits each. The codeword and the speech packet are thus of equal length before summing, which facilitates sample-wise summing.

Typically, orthogonal codewords are of a length that may be different than the packet length of the digital speech packets. Preferably, the codewords with a length that is less than or equal to the packet length of the digital speech packets should be selected. To match the codeword to the digital speech packet, all or part of the selected codeword is repeated—as illustrated in the preceding paragraph. It will be clear to those having ordinary skill in the art, after reading this disclosure, how to make and use alternative embodiments of the present invention that use a different sample size or that use a different number of samples in the packet.

In the illustrative embodiment, the effective bit rate of the steganographic message that is transmitted from transmitter 502 is 200 bits per second. For every digital speech packet comprising 640 bits (80 samples of 8 bits each), the illustrative embodiment transmits m=2 bits of steganographic information, as explained above. At G.711 speeds of 64 kilobits per second, the effective speed of transmission is therefore 2/640×64,000=200 bits per second. It will be clear to those having ordinary skill in the art, after reading this disclosure, how to make and use alternative embodiments of the present invention that result in a different effective bit rate for the transmitted steganographic message.

At task 803, the (i) digital speech signal representing the speech input and (ii) the orthogonal codeword(s) are combined and encoded to create an encoded speech signal for transmission. Task 803 is described in more detail below and in the accompanying figures.

At task 804, the encoded speech signal is transmitted to a receiver at the final destination. Task 804 is described in more detail below and in the accompanying figures.

Figure 9:
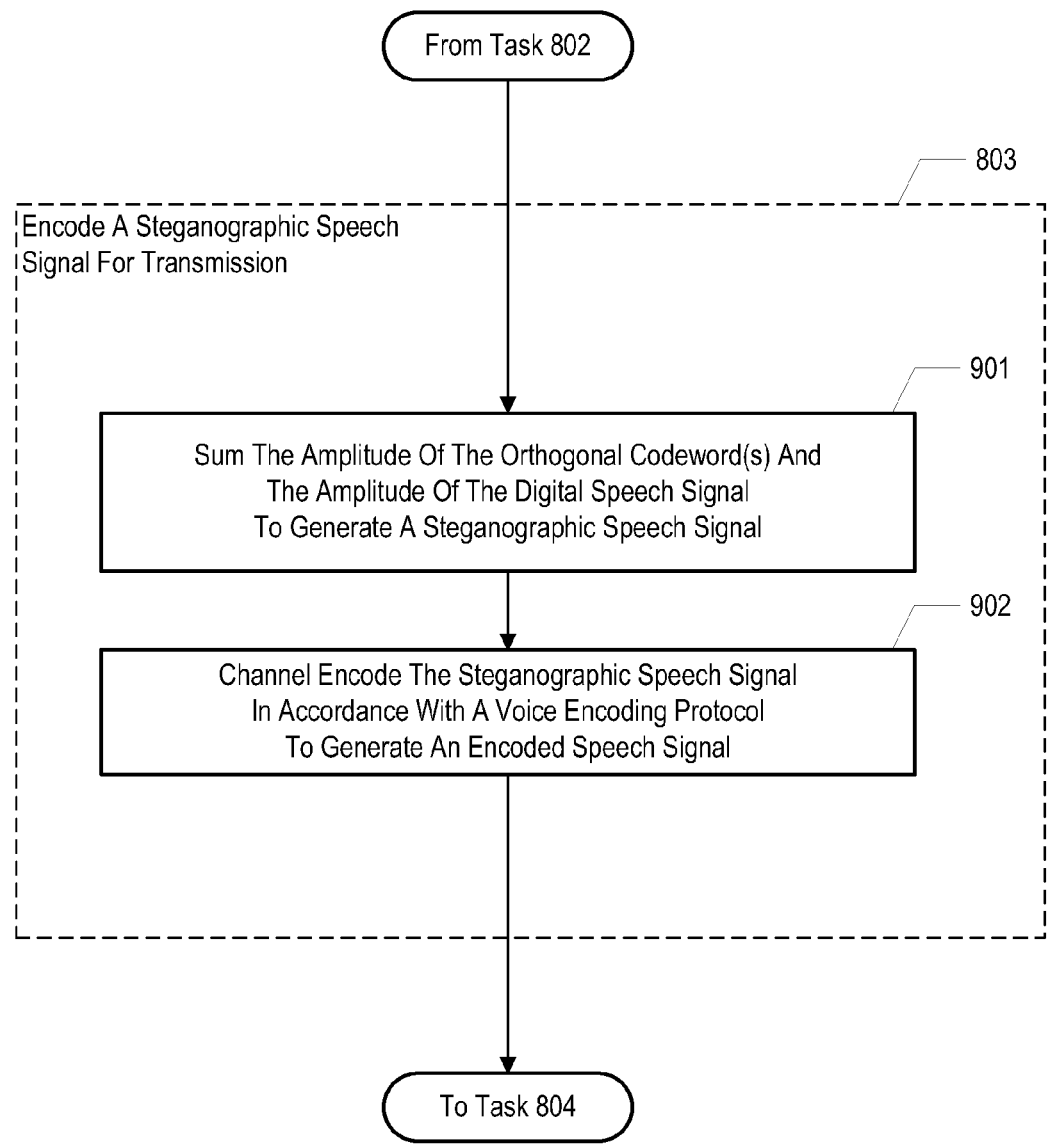
FIG. 9 depicts a flowchart of the salient sub-tasks associated with the performance of task 803.

FIG. 9 depicts a flowchart of the salient sub-tasks associated with the performance of task 803. It will be clear to those having ordinary skill in the art, after reading the present disclosure, how to make and use alternative embodiments of the present invention in which the tasks depicted in FIG. 9 are performed in a different order or are performed concurrently. Furthermore, it will be clear to those having ordinary skill in the art, after reading the present disclosure, how to make and use alternative embodiments of the present invention in which the tasks depicted in FIG. 9 are aggregated differently.

At task 901, the orthogonal codeword(s) and the amplitude of the digital speech signal are summed. In the illustrative embodiment, each packet of voice samples in the digital speech signal receives an orthogonal codeword in the summing operation. In the illustrative embodiment, the length of an orthogonal codeword is identical to the length of a packet in the digital speech signal to facilitate sample-wise summing, i.e., for PCM, 80 samples of 8 bits each.

In the illustrative embodiment, the amplitude ratio of a codeword to its corresponding voice packet is 10%. This ratio represents a balance between enabling reliable detection of the codewords at the receiver and minimizing the audible distortion potentially introduced by the codewords. Although the illustrative embodiment uses a 10% ratio, it will be clear to those having ordinary skill in the art, after reading this disclosure, how to make and use alternative embodiments of the present invention that use a different amplitude ratio that is better suited to the application in the respective embodiment.

The illustrative embodiment uses two voice encoding standards commonly used in Voice over Internet Protocol (VoIP) telecommunications systems—G.711 mu-law and G.729. G.711 is a waveform coding standard, generating 8-bit samples at 8 KHz, resulting in a data rate of 64 kbps. G.729 is a model-based compression standard that transmits only model parameters of the speech at a data rate of 8 Kbps. G.729 transmits no waveform samples, only their model characteristics.

In the illustrative embodiment, the summing of the orthogonal codewords to the digital speech signal is independent of the type of codec used. The summing operation results in a steganographic speech signal.

The summing approach of the present invention is in marked contrast to prior art wherein the operation used for bit-robbing applications is a direct replacement of bits. It will be clear to those having ordinary skill in the art, after reading the present disclosure, how to enable task 901.

At task 902, the steganographic speech signal is channel encoded in accordance with a voice encoding protocol appropriate for the network that is to transport the signal, i.e., G.711 mu-law or G.729 in the illustrative embodiment. The resulting signal is an encoded speech signal. The encoded speech signal thus comprises the orthogonal codeword(s) in the speech payload.

Figure 10:
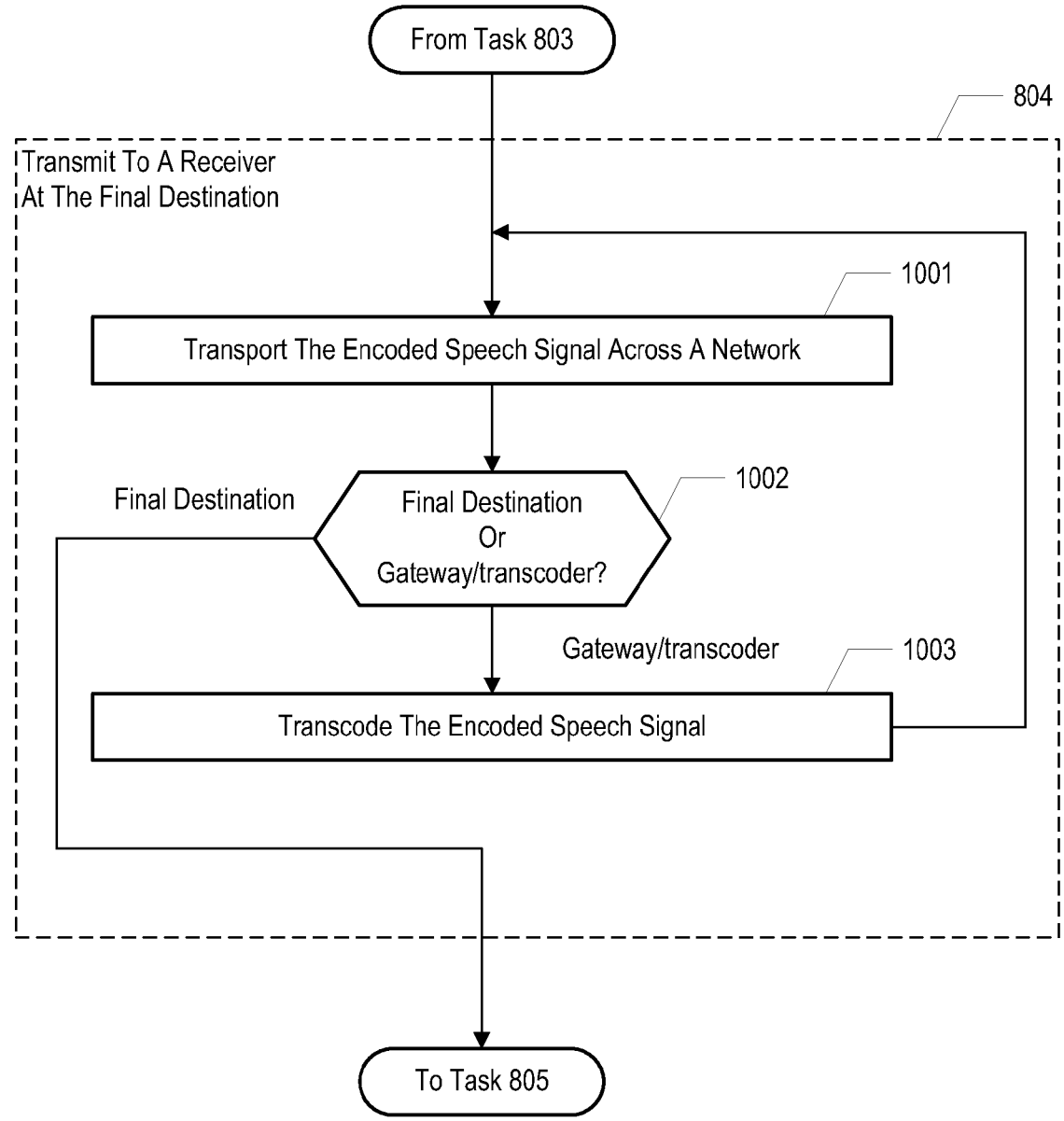
FIG. 10 depicts a flowchart of the salient sub-tasks associated with the performance of task 804.

FIG. 10 depicts a flowchart of the salient sub-tasks associated with the performance of task 804. It will be clear to those having ordinary skill in the art, after reading the present disclosure, how to make and use alternative embodiments of the present invention in which the tasks depicted in FIG. 10 are performed in a different order. Furthermore, it will be clear to those having ordinary skill in the art, after reading the present disclosure, how to make and use alternative embodiments of the present invention in which the tasks depicted in FIG. 10 are aggregated differently.

At task 1001, the encoded speech signal from task 803 is transported across a network in a manner well known in the art.

At task 1002, the encoded speech signal reaches a decision point. When the encoded speech signal reaches a receiver at the final destination, control passes to task 805. On the other hand, when the encoded speech signal reaches a destination that is not final, i.e., a gateway/transcoder or like device, control passes to task 1003. It will be clear to those having ordinary skill in the art how to enable task 1002.

At task 1003, the encoded speech signal undergoes transcoding to another voice encoding protocol in a manner well known in the art. Task 1003 is followed by transport across another network at task 1001 and the process continues indefinitely until the transmitted encoded speech signal reaches a final destination at task 1002.

Figure 11:
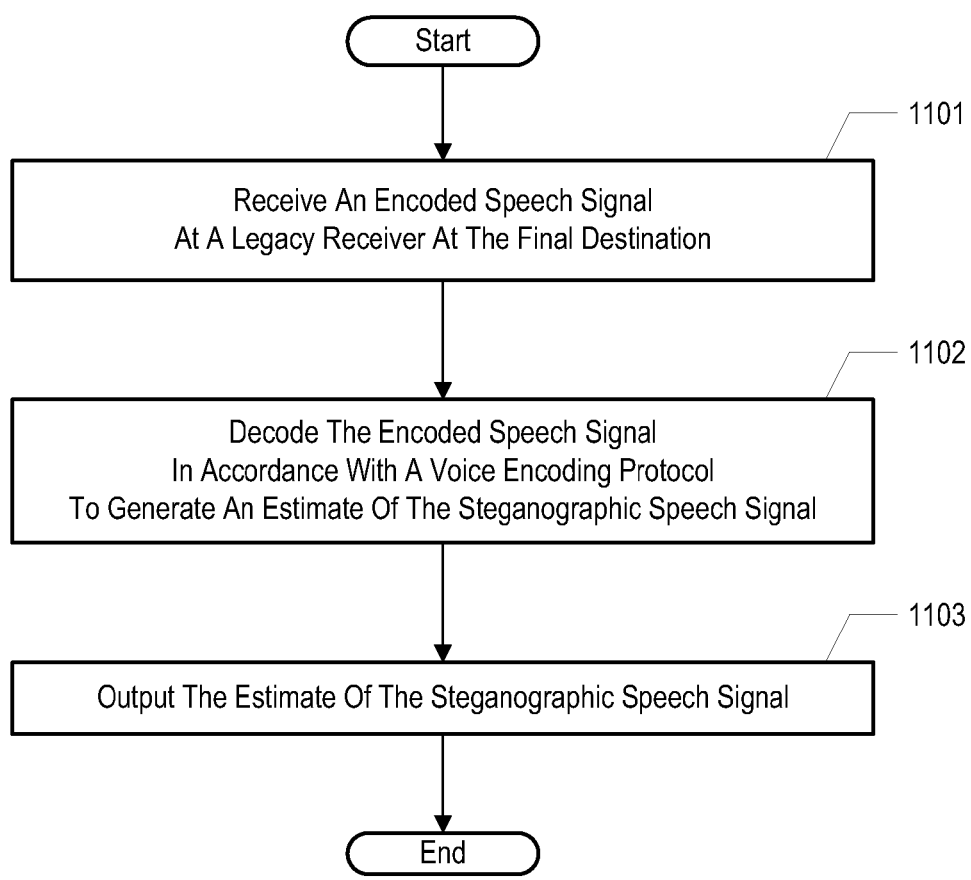
FIG. 11 depicts a flowchart of the salient tasks associated with a legacy receiver that receives a transmission from a transmitter in accordance with the illustrative embodiment of the present invention.

FIG. 11 depicts a flowchart of the salient tasks associated with a legacy receiver that receives a transmission from a transmitter in accordance with the illustrative embodiment of the present invention. This represents an interoperability scenario. It will be clear to those having ordinary skill in the art, after reading the present disclosure, how to make and use alternative embodiments of the present invention in which the tasks depicted in FIG. 11 are performed in a different order. Furthermore, it will be clear to those having ordinary skill in the art, after reading the present disclosure, how to make and use alternative embodiments of the present invention in which the tasks depicted in FIG. 11 are aggregated differently.

At task 1101 a legacy receiver that is the final destination of a transmission from a transmitter according to the present invention receives an encoded speech signal in a manner well known in the art. Because the transmitter is compliant with the present invention, the encoded speech signal comprises orthogonal codeword(s) that were encoded into the payload in accordance with task 803.

At task 1102, having arrived at a receiver at the final destination, the encoded signal is decoded in accordance with an appropriate voice encoding protocol, thus generating an estimate of the steganographic speech signal created at task 803.

At task 1103, there is output that is well known in the art. The receiver outputs the estimate of the steganographic speech signal. The orthogonal codeword(s) remain embedded in the estimate of the steganographic speech signal, because a legacy receiver is not capable of detecting the codeword(s). One of the notable advantages of the present invention is that the orthogonal codeword(s) do not unacceptably degrade the perceptible voice quality of the estimate of the steganographic speech signal. Therefore, the output of the estimate of the steganographic speech signal sounds acceptable or better to a listener.

Figure 12:
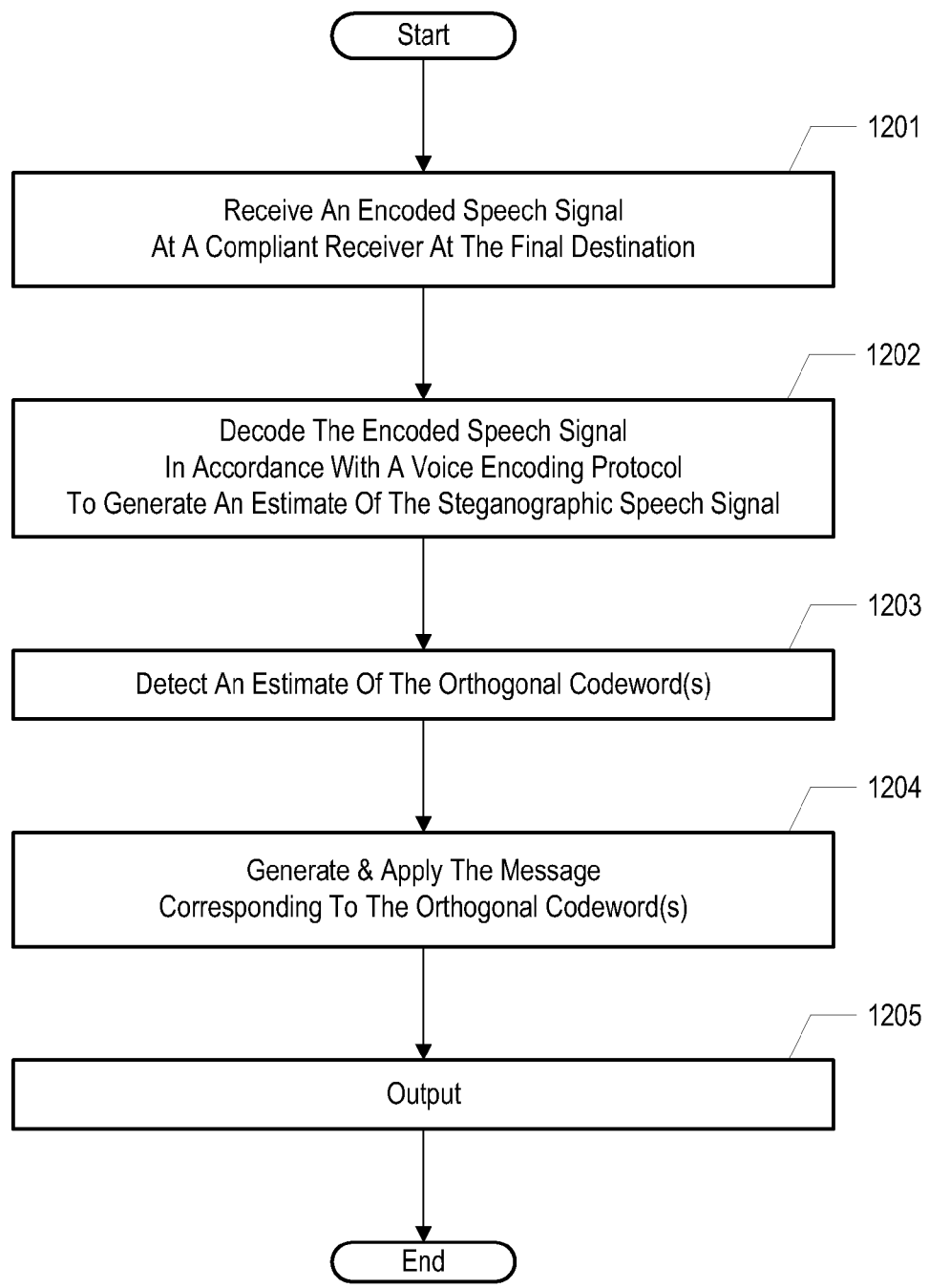
FIG. 12 depicts a flowchart of the salient tasks associated with a compliant receiver that receives a transmission from a transmitter in accordance with the illustrative embodiment of the present invention.

FIG. 12 depicts a flowchart of the salient tasks associated with a compliant receiver that receives a transmission from a transmitter in accordance with the illustrative embodiment of the present invention. It will be clear to those having ordinary skill in the art, after reading the present disclosure, how to make and use alternative embodiments of the present invention in which the tasks depicted in FIG. 12 are performed in a different order. Furthermore, it will be clear to those having ordinary skill in the art, after reading the present disclosure, how to make and use alternative embodiments of the present invention in which the tasks depicted in FIG. 12 are aggregated differently.

At task 1201 a compliant receiver that is the final destination of a transmission from a transmitter according to the present invention receives an encoded speech signal in a manner well known in the art. Because the transmitter is compliant with the present invention, the encoded speech signal comprises orthogonal codeword(s) that were encoded into the payload in accordance with task 803.

At task 1202, having arrived at a receiver at the final destination, the encoded speech signal is decoded in accordance with an appropriate voice encoding protocol, thus generating an estimate of the steganographic speech signal created at task 803.

At task 1203, the compliant receiver detects an estimate of the orthogonal codeword(s) within the estimate of the steganographic speech signal. Task 1203 is described in more detail below and in the accompanying figures.

At task 1204, the message that was converted into orthogonal codeword(s) at task 802 is generated based on the estimate of the orthogonal codeword(s). A plurality of estimated codewords may be necessary to generate the message—corresponding to the codeword generation described at task 802. The message is then applied in accordance with the application. In the illustrative embodiment, the message is an authentication message associated with the transmitter, and thus, a compliant receiver that recognizes the authentication message takes appropriate action, including, but not limited to, connecting an incoming call, playing the estimate of the steganographic speech signal, playing a reconstructed speech signal, etc. Conversely, a compliant receiver that does not authenticate the transmitter takes appropriate action, including, but not limited to, blocking an incoming call, blocking the playing the estimate of the steganographic speech signal, defending against denial-of-service attacks, etc. It will be clear to those having ordinary skill in the art, after reading the present disclosure, how to enable task 1204. It will be clear to those having ordinary skill in the art, after reading the present disclosure, how to make and use an embodiment of the present invention that detects any message at the receiver based on its detection of the orthogonal codeword(s) in the received encoded speech signal.

At task 1205, there is output. In the illustrative embodiment, the compliant receiver outputs the estimate of the steganographic speech signal generated at task 1202. It will be clear to those having ordinary skill in the art, after reading the present disclosure, how to make and use alternative embodiments of the present invention in which the orthogonal codeword(s) are subtracted from the estimate of the steganographic speech signal to generate and output a reconstructed estimate of the digital speech signal.

Figure 13:
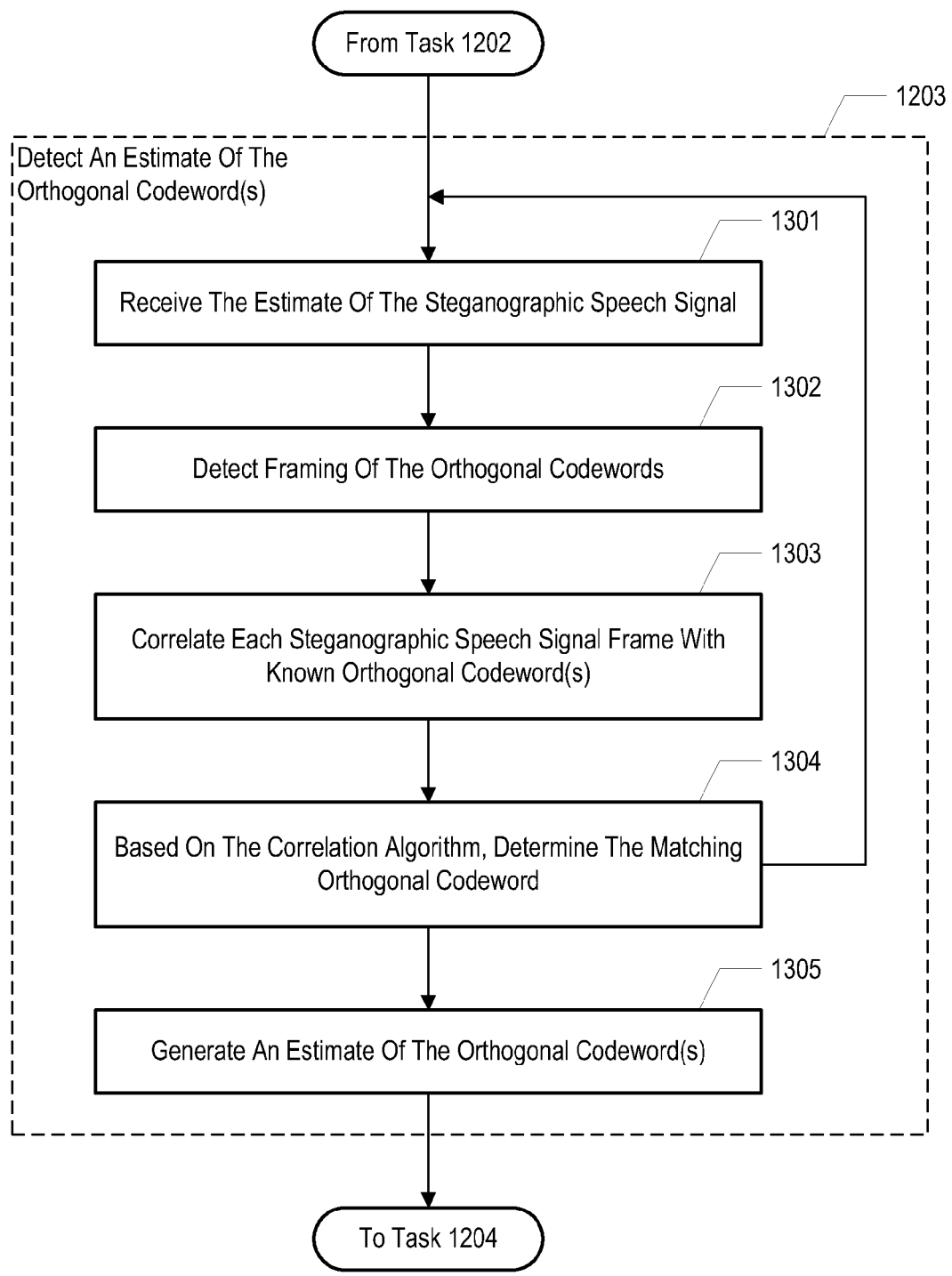
FIG. 13 depicts a flowchart of the salient sub-tasks associated with the performance of task 1203.

FIG. 13 depicts a flowchart of the salient sub-tasks associated with the performance of task 1203. It will be clear to those having ordinary skill in the art, after reading the present disclosure, how to make and use alternative embodiments of the present invention in which the tasks depicted in FIG. 13 are performed in a different order. Furthermore, it will be clear to those having ordinary skill in the art, after reading the present disclosure, how to make and use alternative embodiments of the present invention in which the tasks depicted in FIG. 13 are aggregated differently.

At task 1301, the estimate of the steganographic speech signal is received in a manner well known in the art.

At task 1302, framing of the orthogonal codeword(s) is detected. In the illustrative embodiment, CRC-based framing is used, but it will be clear to those having ordinary skill in the art how to make and use alternative embodiments of the present invention in which any one of a variety of framing techniques that are well known in the art is used to detect framing.

At task 1303, a correlation is performed in a manner well known in the art, comparing each frame of the estimate of the steganographic speech signal with the orthogonal codeword(s) known to the receiver.

At task 1304, a correlation analysis well known in the art yields those orthogonal codeword(s) that match any one of the codewords known to the receiver. In the illustrative embodiment, the orthogonal codeword(s) are Walsh codes that were summed to the digital speech signal at task 901. Task 1304 provides for additional signals to be received that comprise the estimate of the steganographic speech signal, by looping back to task 1301.

It should be noted that one method of increasing the reliability of the present invention is to compose longer orthogonal codewords, e.g., through repetition of a bit pattern. In this way, the detection phase of the present invention yields more reliable results. To further improve the reliability of the present invention, error correction and detection techniques can be applied to the transmitted signals in a manner well known in the art. It will be clear to those having ordinary skill in the art, after reading the present disclosure, how to enable task 1304.

At task 1305, an estimate of the orthogonal codeword(s) is generated, resulting from the analysis in task 1304. It will be clear to those having ordinary skill in the art, after reading the present disclosure, how to enable task 1305.

It is understood that this disclosure teaches just some examples of how the tasks and components of telecommunications system 500 are ordered and organized and that many different variations can be devised by those having ordinary skill in the art after reading this disclosure. It is further understood that the scope of the present invention is to be determined by the following claims.

What is claimed is:

1. A method comprising:
   directly summing by a transmitter the amplitude of a plurality of codewords to the amplitude of a speech signal to generate a steganographic speech signal;
   encoding the steganographic speech signal in accordance with a voice encoding protocol to generate an encoded speech signal;
   decoding the encoded speech signal in accordance with the voice encoding protocol to generate an estimate of the steganographic speech signal;
   detecting by a receiver a framing of orthogonal codewords in the estimate of the steganographic speech signal;
   correlating each frame of the estimate of the steganographic speech signal with an orthogonal codeword known to the receiver, to produce a correlation;
   determining a matching codeword based upon the correlation; and
   generating an estimate of the orthogonal codeword.

2. The method of claim 1 further comprising: outputting the estimate of the steganographic speech signal through a speaker.

3. The method of claim 1 further comprising:
   authenticating the transmitter when the estimate of the plurality of codewords detected by the receiver from the estimate of the steganographic speech signal matches a plurality of codewords associated with the transmitter.

4. The method of claim 1 further comprising:
   subtracting by the receiver the amplitude of the estimate of the plurality of codewords from the amplitude of the estimate of the steganographic speech signal to generate a reconstructed speech signal.

5. The method of claim 1 further comprising:
   outputting the estimate of the steganographic speech signal through a speaker when and only when the estimate of the plurality of codewords detected by the receiver from the estimate of the steganographic speech signal matches a plurality of codewords associated with the transmitter.

6. The method of claim 1 further comprising:
   connecting a call between the transmitter and the receiver when and only when the estimate of the plurality of codewords detected by the receiver from the estimate of the steganographic speech signal matches a plurality of codewords associated with the transmitter.

7. The method of claim 1 further comprising:
   blocking a call from the transmitter when and only when the estimate of the plurality of codewords detected by the receiver from the estimate of the steganographic speech signal is not known to be associated with the transmitter.

8. A method comprising:
   directly summing by a transmitter the amplitude of a plurality of codewords to the amplitude of a speech signal to generate a steganographic speech signal;
   encoding the steganographic speech signal in accordance with a first voice encoding protocol to generate a first encoded speech signal;
   encoding the first encoded speech signal into a second encoded speech signal, wherein the second encoded speech signal is encoded in accordance with a second voice encoding protocol;
   decoding the second encoded speech signal in accordance with the second voice encoding protocol to generate an estimate of the steganographic speech signal;
   detecting by a receiver a framing of orthogonal codewords in the estimate of the steganographic speech signal;
   correlating each frame of the estimate of the steganographic speech signal with an orthogonal codeword known to the receiver, to produce a correlation;
   determining a matching codeword based upon the correlation; and
   generating an estimate of the orthogonal codeword.

9. The method of claim 8 further comprising: outputting the estimate of the steganographic speech signal through a speaker.

10. The method of claim 8 wherein encoding the first encoded speech signal into the second encoded speech signal is performed by transcoding.

11. The method of claim 10 further comprising:
outputting the estimate of the steganographic speech signal through a speaker.

12. The method of claim 8 further comprising:
authenticating the transmitter when the estimate of the plurality of codewords detected by the receiver from the estimate of the steganographic speech signal matches a plurality of codewords associated with the transmitter.

13. The method of claim 12 further comprising:
subtracting by the receiver the amplitude of the estimate of the plurality of codewords from the amplitude of the estimate of the steganographic speech signal to generate a reconstructed speech signal.

14. The method of claim 8 further comprising:
outputting the estimate of the steganographic speech signal through a speaker when and only when the estimate of the plurality of codewords detected by the receiver from the estimate of the steganographic speech signal matches a plurality of codewords associated with the transmitter.

15. The method of claim 8 further comprising:
connecting a call between the transmitter and the receiver when and only when the estimate of the plurality of codewords detected by the receiver from the estimate of the steganographic speech signal matches a plurality of codewords associated with the transmitter.

16. The method of claim 8 further comprising:
blocking a call from the transmitter when and only when the estimate of the plurality of codewords detected by the receiver from the estimate of the steganographic speech signal is not known to be associated with the transmitter.

17. A method comprising:
directly summing by a transmitter the amplitude of a plurality of codewords to the amplitude of a speech signal to generate a steganographic speech signal;
encoding the steganographic speech signal into a first encoded speech signal, wherein the first encoded speech signal is encoded in accordance with a voice encoding protocol;
decoding the first encoded speech signal in accordance with the voice encoding protocol to generate an estimate of the steganographic speech signal;
detecting by a receiver a framing of orthogonal codewords in the estimate of the steganographic speech signal;
correlating each frame of the estimate of the steganographic speech signal with an orthogonal codeword known to the receiver, to produce a correlation;
determining a matching codeword based upon the correlation; and
generating an estimate of the orthogonal codeword, wherein the plurality of codewords represents a message to be hidden in the steganographic speech signal.

18. The method of claim 17 further comprising:
encoding the steganographic speech signal into a first encoded speech signal, wherein the first encoded speech signal is encoded in accordance with a first voice encoding protocol;
encoding the first encoded speech signal into a second encoded speech signal, wherein the second encoded speech signal is encoded in accordance with a second voice encoding protocol;
decoding the second encoded speech signal in accordance with the second voice encoding protocol to generate an estimate of the steganographic speech signal; and
detecting by a receiver an estimate of the plurality of codewords from the estimate of the steganographic speech signal.

19. The method of claim 18 wherein encoding the first encoded speech signal into the second encoded speech signal is performed by transcoding.

* * * * *